United States Patent [19]
Uemura

[11] 3,934,268

[45] Jan. 20, 1976

[54] SYSTEM FOR MAGNETICALLY RECORDING AND REPRODUCING STILL VIDEO PICTURES AND AUDIO INFORMATION

[75] Inventor: Saburo Uemura, Yokohama, Japan

[73] Assignee: Sony Corporation, Tokyo, Japan

[22] Filed: July 31, 1968

[21] Appl. No.: 749,018

[30] Foreign Application Priority Data
Aug. 2, 1967 Japan.............................. 42-49667
Aug. 2, 1967 Japan.............................. 42-49668

[52] U.S. Cl. ............................................. 360/101
[51] Int. Cl.²........................................ G11B 21/02
[58] Field of Search ... 178/6.6 A, 6.6 FSS, 6.6 PSC; 179/100.2 T; 35/35.3

[56] References Cited
UNITED STATES PATENTS

| | | | |
|---|---|---|---|
| 3,051,777 | 8/1962 | Lemelson.............................. | 178/6.6 |
| 3,091,660 | 5/1963 | Houghton et al...................... | 178/6.6 |
| 3,124,661 | 3/1964 | Trapp .................................. | 178/6.6 |
| 3,159,711 | 12/1964 | Schut.................................... | 178/6.6 |
| 3,235,670 | 2/1966 | Kihara ................................. | 178/6.6 |
| 3,258,754 | 6/1966 | Gabor................................... | 178/6.6 |
| 3,283,085 | 11/1966 | Lemke................................. | 178/6.6 |
| 3,294,902 | 12/1966 | Maxey ................................. | 178/6.6 |
| 3,389,217 | 6/1968 | Kihara ................................. | 178/6.6 |
| 3,395,385 | 7/1968 | Scoville............................... | 178/6.6 |
| 3,435,135 | 3/1969 | Yasuoka et al...................... | 178/6.6 |
| 3,454,713 | 7/1969 | Yanagimachi et al............... | 178/6.6 |

*Primary Examiner*—Robert S. Tupper
*Attorney, Agent, or Firm*—Lewis H. Eslinger; Alvin Sinderbrand

[57] ABSTRACT

A system for recording and reproducing both still pictures and sounds related to such pictures employs a magnetic tape having index signals at intervals therealong to identify respective portions of the tape which is moved in a predetermined path to bring a selected tape portion to a recording and reproducing station at which video signal and audio signal magnetic heads are moved at relatively high and low speeds, respectively, across the path, preferably obliquely thereto, for scanning respective stripe-like areas on selected tape portion, and the heads are operated during the movement thereof to selectively record and reproduce video and audio signals in the respective stripe-like areas being scanned thereby.

2 Claims, 5 Drawing Figures

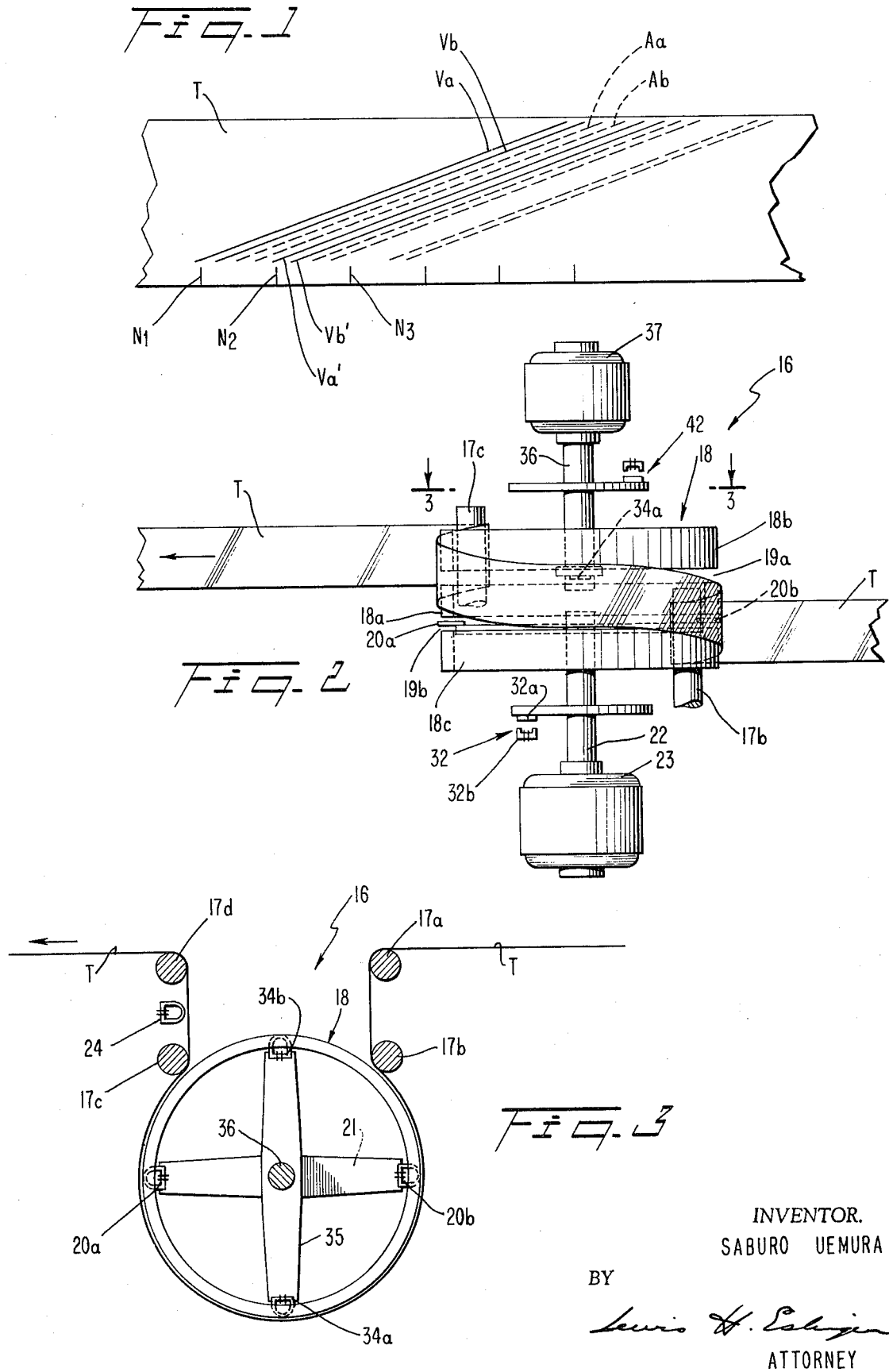

INVENTOR.
SABURO UEMURA
BY
ATTORNEY

SYSTEM FOR MAGNETICALLY RECORDING AND REPRODUCING STILL VIDEO PICTURES AND AUDIO INFORMATION

This invention relates generally to magnetic recording and reproducing systems, and more particularly is directed to systems by which documents, pictures or other visual information and corresponding sounds or oral explanations can be recorded, and ready access may be had to any selected document, picture or visual information and the corresponding sounds or oral explanations for virtually instantaneous reproduction thereof.

It is now well known to utilize a magnetic recording and reproducing system to record and reproduce motion pictures or television video signals, such a system being commonly referred to as a video tape recorder. In video tape recorders, the television signals are recorded and reproduced or displayed in a specified order and time relationship corresponding to the order and time relationship of the respective frames. It has also been proposed to employ a similar system for recording and selectively reproducing or displaying various bits or pieces of information, such as the contents of books, photographs, graphs, tables or other documents convertible into corresponding data or document signals in the form of video signals which are recorded on a magnetic tape and thereafter reproduced therefrom. It will be apparent that each recorded data or document signal bears no specified time relationship to any other document signal, so that the retrieval of any selected bit or piece of recorded information requires that each such bit or piece of information be recorded in association with a particular index signal by which it can be located and identified when its reproduction or display is desired.

In my copending U.S. patent applications Ser. No. 591,596, filed Nov. 2, 1966, and Ser. No. 691,787, filed Dec. 19, 1967, I have disclosed data retrieval systems of the type described above in which the index or identification signals are all the same and the locations along a magnetic tape at which the various bits or pieces of information are recorded are identified and selected by counting the numbers of such index signals from one end or the other of the tape to the location of the selected document signal. In such previously disclosed data retrieval systems, only visual information, such as the contents of books, photographs, graphs, tables, or other documents, can be recorded and selectively reproduced, whereby the possible applications of such systems are limited.

Accordingly, it is an object of this invention to provide a system by which documents, pictures or other visual information and also corresponding sounds or oral explanations can be recorded, and ready access may be had to any selected document, picture or visual information and the corresponding sounds or oral explanations for virtually instantaneous reproduction thereof.

In accordance with an aspect of this invention, a system for recording and reproducing both still pictures or other visual information and sounds related to such pictures employs a magnetic tape having index signals at intervals therealong to identify respective portions of the tape which is moved in a predetermined path to bring a selected tape portion to a recording and reproducing station at which video signals and audio signal magnetic heads are moved at relatively high and low speeds, respectively, across the path, for example, by being rotated in spaced parallel planes extending obliquely with respect to the path of the tape, for scanning respective stripe-like areas on the selected tape portion, and the heads are operated during the movement thereof to selectively record and reproduce video and audio signals in the respective stripe-like areas being scanned thereby. By reason of the relatively low speed at which the audio signal magnetic head or heads move during scanning of the respective stripe-like area or areas of a selected tape portion, such stripe-like area or areas may have recorded therein audio signals corresponding to sounds of substantial duration, for example, a duration of 20 seconds, so as to be sufficient for an oral explanation, description or the like corresponding to the still picture, document or other visual information represented by the video signal recorded in the stripe-like area or areas of the same tape portion.

A system according to this invention, by reason of its capability of recording visual information and corresponding sounds and of affording ready access to any selected recorded visual information and the corresponding sounds for virtually instantaneous reproduction thereof, is suitable for advertising, education or information purposes, as will be apparent.

The above, and other objects, features and advantages of the invention, will be apparent in the following detailed description of illustrative embodiments thereof which is to be read in connection with the accompanying drawings, wherein:

FIG. 1 is a schematic view of a length of magnetic tape having video, audio and index signals recorded thereon in accordance with this invention;

FIG. 2 is a schematic elevational view of a magnetic recording and reproducing unit according to this invention;

FIG. 3 is a schematic sectional view taken along the line III—III on FIG. 2;

Figure 4:
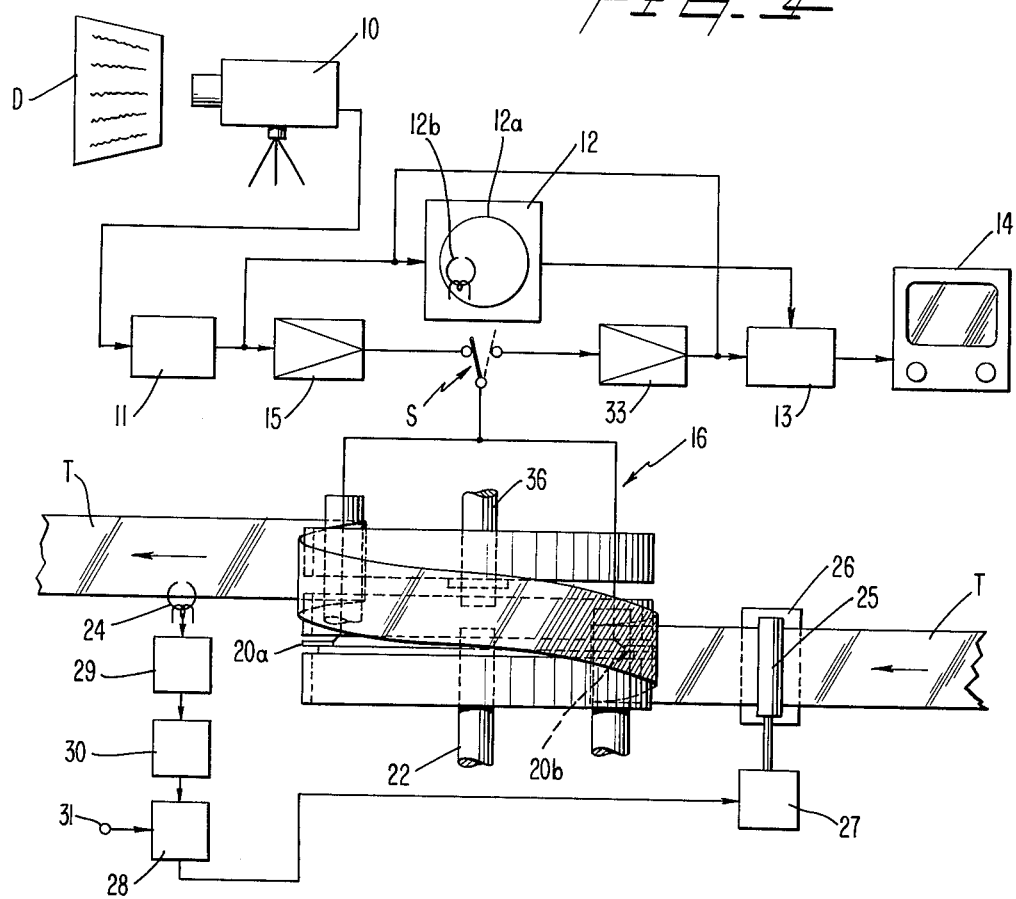
FIG. 4 is a schematic and block diagram illustrating the major components of a magnetic recording and reproducing system according to this invention.
Figure 5:
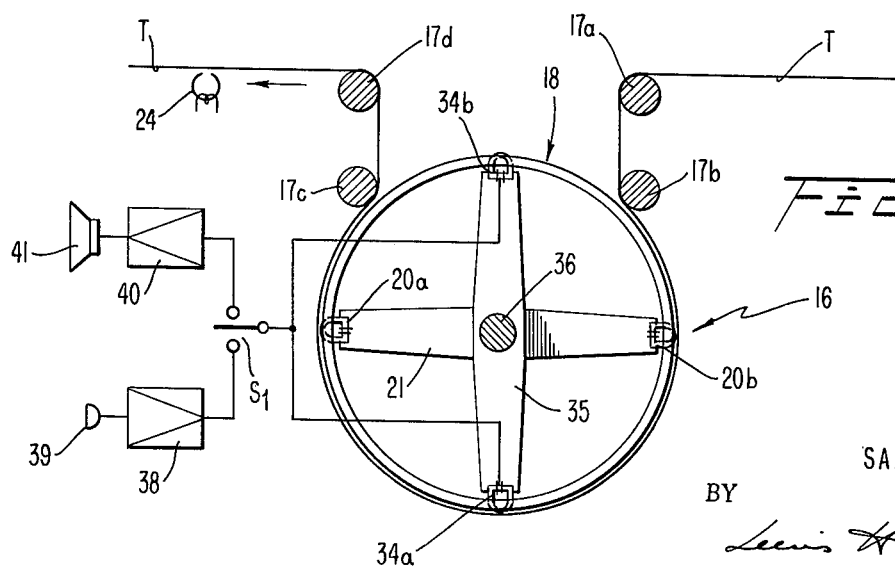
FIG. 5 is a further schematic and block diagram illustrating additional components of the system.

Referring to the drawings in detail and initially to FIGS. 4 and 5 thereof, it will be seen that a magnetic recording and reproducing system according to this invention, as there shown, comprises an image pickup unit or television camera 10 for picking up the image of a document D, such as the page of a book, a photograph, graph, table or other visual information to be recorded, and for converting the image of document D into a corresponding video signal which is transmitted through a modulator 11 for angular modulation by the latter. The angularly modulated video signal is transmitted to a video signal storing device 12 where the video signal is recorded and can be reproduced repeatedly for any desired duration. For example, the video signal storing device 12 may include a magnetic disk or sheet 12a which is suitably rotated to effect a single revolution in the time required for a video signal corresponding to the image of document D, whereby the video signal corresponding to the document will be recorded, as by a recording and reproducing head 12b in an annular track on disk 12a. The video signal stored in device 12 and reproduced by head 12b thereof may be transmitted through an angular demodulator 13 to a monitor 14 in which the video signal is converted to a visual display corresponding to the document D. It will be apparent that the visual display of document D at monitor 14, that is, a still picture of the document, can be maintained for as long as desired by reason of the recording of the corresponding video signal in storage device 12. Alternatively, as shown, the video signal can be transmitted directly from modulator 11 through demodulator 13 to monitor 14, whereby to display a picture of document D at monitor 14 so long as an image of such document is being picked up by camera 10.

The angularly modulated video signal is further transmitted through a recording amplifier 15 and a recording and play-back switch S, when the latter is in its recording position R, as shown, to a magnetic recording and reproducing unit generally identified by the reference numeral 16. A particular embodiment of the magnetic recording and reproducing unit 16 according to this invention will now be described with reference to FIGS. 2 and 3. As shown, such unit 16 generally includes a magnetic recording medium in the form of a tape T movable along a path between supply and take-up reels (not shown) and being guided in such path, as by guide posts or rollers 17a, 17b, 17c and 17d, to wrap partially around the periphery of a cylindrical guide assembly 18, with the guide posts 17b and 17c being displaced relative to each other in the axial direction of cylindrical guide assembly 18 so that planes normal to the axis of guide assembly 18 are disposed obliquely with respect to the direction of movement of tape T between guide posts 17b and 17c. As shown, guide assembly 18 includes a middle cylindrical part 18a and cylindrical parts 18b and 18c which are spaced axially, and aligned with middle cylindrical part 18a so as to define annular gaps 19a and 19b between part 18a and parts 18b and 18c, respectively. One or more video signal magnetic recording and reproducing heads, for example, the diametrically opposed heads 20a and 20b, are mounted to extend through gap 19b for rotation in a plane that extends obliquely with respect to the direction of movement of tape T on cylindrical guide assembly 18. As shown, heads 20a and 20b may be mounted at the ends of a support arm 21 which, at its center, is supported on a shaft 22 which is coaxial with cylindrical guide assembly 18 and driven by a motor 23. The heads 20a and 20b are displaced a small distance from each other in the direction parallel to the axis of shaft 22 so that, during each revolution of shaft 22, for example, at a rotational speed of 30 revolutions per second, heads 20a and 20b will scan slightly spaced apart, stripe-like areas of the tape extending thereacross obliquely with respect to the longitudinal direction of movement of the tape, for example, the stripe-like areas Va and Vb, respectively, shown on FIG. 1.

The rotation of heads 20a and 20b by motor 23 is synchronized with the scanning of document D by camera 10 and also with the rotation of the magnetic disk 12a of storing device 12 so that the time for a revolution of shaft 22 will correspond to the time for a video signal corresponding to the complete document D. As shown on FIG. 4, heads 20a and 20b are connected to recording and play-back switch S so that, when the latter is in its recording position R, the video signal corresponding to a single frame, that is, to the complete document D, will be recorded in the stripe-like areas Va and Vb of the tape which are scanned by the heads 20a and 20b, respectively.

As shown on FIG. 1, the magnetic tape T has index signals $N_1$, $N_2$, $N_3$ etc., recorded thereon at intervals in the direction of movement of the tape and each corresponding to and identifying a video signal recorded, or to be recorded, in tracks extending obliquely to the direction of tape movement similarly to the stripe-like areas scanned by heads 20a and 20b. The video signal recorded in each pair of oblique or skew tracks represents one document page or other visual information which is to be recorded and then retrieved and displayed at monitor 14. As disclosed in my previously mentioned copending application Ser. No. 591,596, all of the index signals may be the same, in which case each video signal is identified by the number of its corresponding index signal counted from one end or the other of tape T, and any particular video signal can be located merely by moving the tape and counting the index signals as reproduced by a fixed magnetic head 24 (FIGS. 3, 4 and 5) until the number of such signals corresponds to that of the index signal identifying the desired video signal. As shown on FIG. 4, the tape T may be moved in either direction by means of a capstan 25 cooperating with a pinch roller 26 and being driven by a motor 27 under the control of a control circuit 28. The index or address signals on tape T, as reproduced by head 24, are detected by a circuit 29 and converted into a suitable wave form by a circuit 30 before being fed into control circuit 28. The control circuit 28 also receives, at a terminal 31 thereof, a suitable request signal corresponding to a selected portion of tape T in which a video signal is to be recorded, or from which a video signal is to be reproduced. Within control circuit 28, a suitable reversible counter which receives the signals from circuit 30 provides a tape position indicating signal, and also a comparator circuit which compares such tape position indicating signal with the request from terminal 31 and, in dependence on their relative magnitudes or other characteristics, issues suitable signals for controlling the operation of motor 27. Thus, when a request signal corresponding to a particular portion of tape T is fed to control circuit 28 and such portion of the tape is not disposed at the recording and reproducing station or unit 16, motor 27 is operated to move tape T until head 24 detects the index signal which corresponds to the location of the desired tape portion at unit 16, whereupon operation of motor 27 is halted.

With the tape thus positioned, motor 23 is operated to cause heads 20a and 20b to record a video signal in the stripe-like areas Va and Vb of such tape portion, when recording is being effected, or to cause the heads 20a and 20b to successively reproduce the video signal previously recorded in the stripe-like areas Va and Vb of the tape portion then positioned at the recording and reproducing station. As previously mentioned, the rotation of heads 20a and 20b is synchronized with the operations of camera 10, storing device 12 and monitor 14, and such synchronization may be conveniently effected by means of synchronizing pulses produced by a generator 32 (FIG. 2) which is constituted by a fixed magnet 32a mounted for rotation with shaft 22 and a magnetic head 32b which is fixedly located adjacent to the circular path of travel of magnet 32a.

When a video signal previously recorded in stripe-like areas Va and Vb of a selected portion of tape T is to be reproduced, tape T is again moved, as described above, to locate the selected tape portion at the recording and reproducing station, and heads 20a and 20b are rotated with switch S in its play-back position P so that the desired video signal, as reproduced by heads 20a and 20b is transmitted through a play-back amplifier 33 either to storing device 12 or directly through demodulator 13 to monitor 14 for display of the corresponding picture at the monitor. It will be apparent that, so long as tape T remains at the selected position and heads 20a and 20b are continuously rotated, the video signal recorded on the selected portion of the tape will be repetitively reproduced so as to provide a constant display of the respective image or picture at monitor 14. Alternatively, once the reproduced video signal is recorded in storing device 12, tape T can be moved from the selected position and the reproduced video signal can be repetitively supplied to monitor 14 from storing device 12 so as to provide a continuous display of the respective image at the monitor.

In accordance with the present invention, the recording and reproducing unit 16 further comprises one or more audio signal magnetic recording and reproducing heads, for example, the diametrically opposed heads 34a and 34b, which are mounted to extend through gap 19a for rotation in a plane that extends obliquely with respect to the direction of movement of tape T on cylindrical guide assembly 18, and which is parallel to and spaced from the plane of rotation of heads 20a and 20b. As shown, heads 34a and 34b may be mounted at the ends of a support arm 35 (FIGS. 3 and 5) which, at its center is supported on a shaft 36 which is coaxial with cylindrical guide assembly 18 and driven by a motor 37. The heads 34a and 34b are displaced a small distance from each other in the direction parallel to the axis of shaft 36 so that, during each revolution of shaft 36, for example, at a rotational speed of 1/20th of a revolution per second, heads 34a and 34b will scan slightly spaced apart, stripe-like areas of the tape extending thereacross obliquely with respect to the longitudinal direction of movement of the tape, for example, the stripe-like areas $A_a$ and $A_b$, respectively, shown on FIG. 1.

The heads 34a and 34b are both selectively connected through a recording and play-back switch $S_1$ either to an amplifier 38 connected to a microphone 39 or to an amplifier 40 connected to a loudspeaker 41. Thus, when switch $S_1$ is in its recording position R, heads 34a and 34b are made operative to magnetically record audio signals in stripe-like areas $A_a$ and $A_b$, respectively of the tape portion there disposed at the unit 16, which signals correspond to sounds picked-up by microphone 39. On the other hand, when switch $S_1$ is in its play-back position P, heads 34a and 34b are made operative to reproduce the audio signals previously recorded in the stripe-like areas $A_a$ and $A_b$ there being scanned by such heads, and the reproduced audio signals are translated into the corresponding sounds by loudspeaker 41.

Synchronizing pulses may also be produced by a generator 42 (FIG. 2) constituted by a permanent magnet rotated with shaft 36 and a magnetic head fixed adjacent the circular path of such magnet to provide a pulse during each revolution of the shaft. Such synchronizing pulses from generator 42 may be employed to synchronize the recording and reproduction of the audio signals during the relatively slow rotation of heads 34a and 34b with the recording and reproduction, respectively, of the video signals during the relatively high speed rotation of heads 20a and 20b.

By reason of the slow speed rotation of heads 34a and 34b by motor 37, sounds of relatively long duration can be recorded in, and reproduced from the two stripe-like areas $A_a$ and $A_b$ in each selected portion of tape T. Thus, for example, if the tracks or stripe-like areas $A_a$ and $A_b$ have a combined length of 50 cm, that is, 25 cm per track, and if shaft 36 rotates at a speed of 1/20th revolution per second, the recording speed is 2.5 cm./sec. and the tracks $A_a$ and $A_b$ will accommodate a recorded sound having a duration of 20 seconds.

During the reproduction of sounds of such duration, the video signal representing the corresponding picture or visual information is repetitively supplied to monitor 14 preferably from storing device 12, or alternatively from heads 20a and 20b. In the case where heads 20a and 20b are rotated at a speed of 30 revolutions per second and heads 34a and 34b are rotated at 1/20th revolution per second, as mentioned above, the video signal will be supplied to monitor 14 600 times during the reproduction of the sound of 20 seconds duration. Thus, it is preferred that the reproduction of the video signal by heads 20a and 20b occur only during a single revolution of such heads, with the reproduced video signal being recorded in storing device 12 for repetitive supply therefrom to monitor 14.

It will be apparent that with the system described above, video signals and audio signals corresponding to large numbers of still pictures or visual information and related sounds can be recorded on a single tape and immediately retrieved for simultaneous reproduction. Such system obviously is ideally suited for educational and informational purposes as well as for use as an advertising device.

Although illustrative embodiments of the invention have been described herein with reference to the accompanying drawings, it is to be understood that the invention is not limited to those precise embodiments and that various changes and modifications may be effected therein by one skilled in the art without departing from the scope or spirit of the invention as defined in the appended claims.

What is claimed is:

1. In a magnetic recording and reproducing system, a magnetic recording tape guided for movement in a predetermined path; means for effecting the controlled movement of said tape in said path so as to dispose a selected portion of the tape at rest at a recording and reproducing station adjacent said path, said path including a section at said station where said tape is wrapped at least partly around a cylindrical guide surface at an angle normal to planes normal to the axis of said surface; two video signal magnetic heads mounted at said station diametrically opposed to each other and spaced from each other in the direction of said axis; means imparting cyclical rotary movement to said heads to move said heads in first and second planes normal to said axis and across said path to scan repeatedly first and second elongated areas that extend obliquely across said selected portion of the tape while the latter is at rest; means to operate said heads for selectively recording and reproducing video signals in said elongated areas of the tape which are scanned thereby, first and second audio signal magnetic heads mounted at said station diametrically opposed to each other and axially spaced from each other and from said two video signal magnetic heads in the direction of said axis; means operative when the tape is at rest to impart cyclical rotary movements to move said audio signal magnetic heads in respective third and fourth planes parallel to said first and second planes so as to scan third and fourth elongated areas of said selected portion which are parallel to, substantially of the same length as, and spaced from the first and second elongated areas; means to operate said audio signal magnetic heads for selectively recording and reproducing audio signals in the third and fourth elongated areas scanned thereby; and means synchronizing said cyclical movements of said audio signal magnetic heads at a speed of which the speed of said cyclical movements of the video signal magnetic heads is a whole multiple, whereby during each revolution of said audio signal heads the latter scan said third and fourth elongated areas of said selected portion of the tape while said video signal magnetic heads repeatedly traverse said first and second elongated areas of said selected portion of the tape scanned thereby.

2. In a magnetic recording and reproducing system, a magnetic recording medium guided for movement in a predetermined path, means for effecting the controlled movement of said medium in said path so as to dispose a selected portion of the medium at rest at a recording and reproducing station adjacent said path, at least one video signal magnetic head mounted at said station, means imparting cyclical movements to said head across said path to repeatedly scan an elongated area of said selected portion of the medium while the latter is at rest, means to operate said head for selectively recording and reproducing video signals in said elongated area of the medium which is scanned thereby, at least one audio signal magnetic head mounted at said station and being spaced axially from said video signal magnetic head, means operative when the medium is at rest to impart cyclical movements to said audio signal magnetic head parallel to said cyclical movements of said video signal magnetic head so as to scan an elongated area of said selected portion which is parallel to, substantially of the same length as, and spaced from the first mentioned elongated area, and means to operate said audio signal magnetic head for selectively recording and reproducing audio signals in the elongated area scanned thereby, means synchronizing said cyclical movements of said audio signal magnetic head at a speed of which the speed of said cyclical movements of the video signal magnetic head is a whole multiple, whereby to permit the recording in the area of said selected portion of the medium scanned by said audio signal magnetic head of audio signals representing sounds of substantial duration while said video signal magnetic head repeatedly traverses the area of said selected portion of the medium scanned thereby; said system further comprising a storing device operable selectively to record video signals reproduced by said video signal magnetic head during one traverse by the latter of said area of the selected portion of said medium scanned by said video magnetic head and to continuously reproduce the video signals recorded by said storing device, and visual display means operable by said video signals continuously reproduced by said storing device for displaying the corresponding visual information during said duration of the sounds represented by the audio signals being reproduced by said audio magnetic head.

* * * * *